United States Patent [19]

Peterson

[11] Patent Number: 5,523,357
[45] Date of Patent: Jun. 4, 1996

[54] CSPE/CPE BLEND MEMBRANE

[75] Inventor: Arnold G. Peterson, Kernersville, N.C.

[73] Assignee: JPS Elastomerics Corporation, Northampton, Mass.

[21] Appl. No.: 780,892

[22] Filed: Oct. 23, 1991

[51] Int. Cl.[6] ........................... C08L 23/34
[52] U.S. Cl. ............. 525/240; 428/490; 428/523
[58] Field of Search .............. 525/240; 428/523, 428/490

[56] References Cited

U.S. PATENT DOCUMENTS

| | | | |
|---|---|---|---|
| 2,711,986 | 6/1955 | Strain et al. | 525/240 |
| 3,125,548 | 3/1964 | Anderson | 525/240 |
| 3,351,677 | 11/1967 | Barton et al. | 525/240 |
| 3,558,762 | 1/1971 | Kohnlein et al. | 525/240 |
| 3,575,779 | 4/1971 | Chapman et al. | 525/240 |

*Primary Examiner*—Paul R. Michl
*Assistant Examiner*—John J. Guarriello
*Attorney, Agent, or Firm*—Fishman, Dionne & Cantor

[57] ABSTRACT

A blend of chlorosulfonated polyethylene (CSPE) and amorphous chlorinated polyethylene (CPE) together with an additive of crystalline thermoplastic polyolefin (e.g., ultralow density polyethlene) is presented. This material is easily processed on the rolls of a rubbermill (i.e., calender) to form continuous sheets of membrane suitable for use in single ply roofing and other similar applications. In a preferred embodiment, a membrane formed from the composition of this invention is used as the upper layer of a multilayer single ply roof.

17 Claims, 1 Drawing Sheet

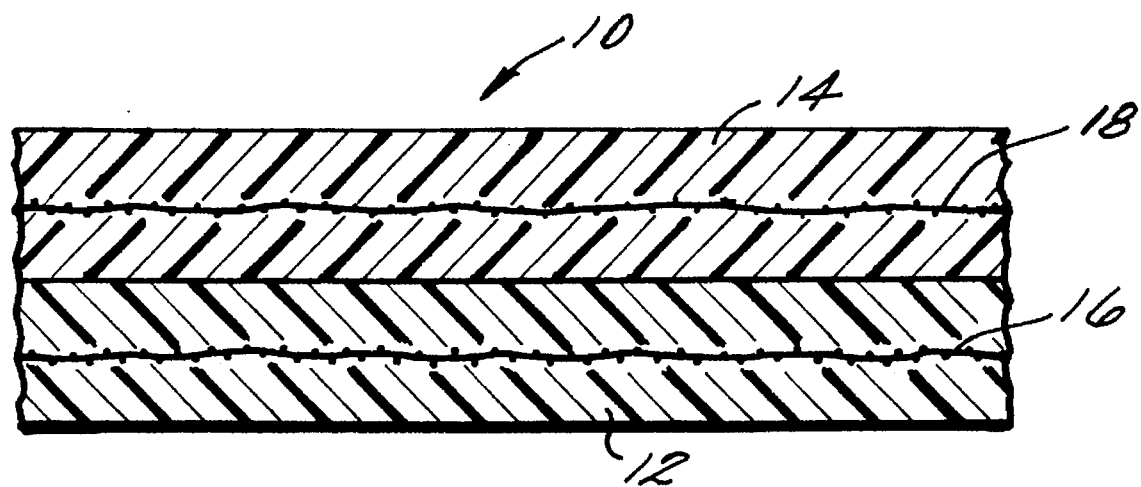
FIG.

CSPE/CPE BLEND MEMBRANE

BACKGROUND OF THE INVENTION

This invention relates generally to a flexible polymeric membrane. More particularly, this invention relates to a flexible polymeric membrane for a roof or in other applications such as fluid containment liners and covers (e.g., reservoir and land fill liners and covers).

While the present invention will be described in connection with a roof application, it will be appreciated that the roof membrane disclosed herein may also be useful in other applications requiring heat weldable, water resistant, chemical resistant polymeric membranes.

In certain modern roofing installations for commercial buildings, a layer of insulation is secured to the deck of the roof and then is covered with sheets of flexible material. Adjacent margins of adjacent sheets are sealed together (e.g., heat welded) in overlapping relationship and thus the sheets form a sealing membrane over the insulation.

The sheets which form the membrane are secured to the insulation and the underlying roof deck at spaced locations by fastener assemblies which are spaced along the margins of the sheets. Each fastener assembly comprises a washer-like disc and further comprises a screw adapted to thread into the roof deck to cause the disc to clamp the membrane downwardly against the insulation.

A particularly successful single ply roofing material is based on synthetic rubbers made from chlorosulfonated polyethylenes (CSPE) such as HYPALON synthetic rubber made by E.I. DuPont DeNemours & Co. Chlorosulfonated polyethylenes exhibit excellent physical and chemical properties; and usually resist the deteriorating effects of ozone, oxygen, weather, heat and chemicals. CSPE is also easily processable into continuous sheets using conventional calendering equipment. As a result, CSPE is extremely well suited for use as a single ply roof and in other similar applications such as reservoir covers and land fill liners.

While well suited for its intended purposes, it has been determined that under certain severe environmental conditions with a high incidence of air pollution (i.e., produced by auto exhaust and similar industrial effluents), a roofing membrane based on chlorosulfonated polyethylenes may exhibit cracking. This is undesirable as it may result in the failure of the roof. Cracking is caused by pools of water (e.g., rain water) which collect on a roof. These pools contain a variety of pollutants. As the water in the pools evaporate, a viscous, sludge material is left behind. This viscous sludge is further transformed (under solar exposure) to a hard glassy structure similar to a dried varnish which adheres tightly to the roof. During the latter portion of this drying process, the hardened sludge shrinks with such shrinking process causing tears and cracks in the rubbery roof membrane.

SUMMARY OF THE INVENTION

The above-discussed and other drawbacks and deficiencies of the prior art are overcome or alleviated by the novel polymeric membrane of the present invention. In accordance with the present invention, it has been discovered that the problematic tearing and cracking of CSPE roof membranes exhibited in air polluted environments is overcome by blending the chlorosulfonated polyethylene (CSPE) with amorphous chlorinated polyethylene (CPE) and with high crystalline polyolefin (such as ultra low density polyethylene sold under the trademark ATTANE by Dow Chemical Co.), to form a tripolymer blend. Preferably, a roof membrane formulation in accordance with this invention also comprises still other components such as heat stabilizers, process aids, flame retardants, fillers and colored pigments.

The CSPE/CPE tripolymer blend membrane of this invention does not exhibit the cracking and tearing associated with prior art CSPE materials, even in highly polluted environments. It is theorized that the CPE enhances the physical properties of the membrane which reduces cracking and tearing. In addition, it is believed that the use of the high crystalline polyolefin reduces the adhesion characteristics between the dried glassy sludge (which results from the pollutants) and the membrane thereby further inhibiting cracking.

The above-discussed and other features and advantages of the present invention will be appreciated and understood by those of ordinary skill in the art from the following detailed description and drawing.

BRIEF DESCRIPTION OR THE DRAWING

The single FIGURE depicts a single ply roof membrane composed of a bottom layer and a top layer fused to the bottom layer.

BRIEF DESCRIPTION OF THE PREFERRED EMBODIMENT

The present invention relates to a membrane which is well suited for use as a single ply roof. This is comprised of a tripolymer blend of chlorosulfonated polyethylenes (CSPE), amorphous chlorinated polyethylene (CPE), and crystalline thermoplastic polyolefin (e.g., ultra low density polyethylene). Preferably the blend of CSPE/CPE should comprise 30 to 38 weight percent (preferably 36%) of the total membrane formulation with the ratio of CSPE/CPE within that 30 to 38% being about 50:50, preferably 49–51:51–49. It has been determined that the undesirable cracking problem is more prevalent when the combined CSPE/CPE component rises above about 38 weight %. Combined CSPE/CPE of less than about 30 weight % suffers from poor heat sealing (or weldability) which is an important characteristic of single ply roof membranes.

Suitable chlorosulfonated polyethylenes for this invention include HYPALON 45 from DuPont.

Suitable amorphous chlorinated polyethylenes are described in U.S. Pat. Nos. 4,910,245, 4,978,716 and 4,978,703, which are incorporated herein by reference. Commercially available CPE suitable for this invention includes TRYIN 725 manufactured by Dow Chemical Co. and PARACHLOR 125X sold by Uniroyal Chemical Co., Inc. It is believed that the PARACHLOR 125X may be the preferred CPE for this invention.

With regard to the following additional additives, it will be appreciated that X part by weight makes reference to the combined CSPE/CPE as 100 parts.

An important additional component in accordance with this invention comprises high crystalline polyolefins such as ultra low density polyethylenes (preferably 15 to 30 parts by weight of the total CSPE/CPE combined polymers). Other examples of suitable polyolefins are described in the aforementioned U.S. Pat. Nos. 4,910,245, 4,978,716 and 4,978,703. Suitable commercially available polyolefins include ATTANE 4004 (ethylene octene copolymer of higher alpha olefins) manufactured by Dow Chemical Co. and FLEXOMER 9065 manufactured by Union Carbide Co.

In addition, at least one stabalizer and suitable processing aids are preferably added to the blend. The stabilizer, preferably 4 to 6 parts by weight of the combined CPE/CSPE is an important part of this invention, as it protects the polymers from liberating HCL during processing, promotes crosslinking by the formation of ionic bonds in the CSPE without vulcanization and acts as a synergist with $TiO_2$ to provide outstanding weathering/UV light protection in a white formulation. In this regard, the stabilizer and $TiO_2$ additives should be used in tandem if long term weatherability is to be maintained. Suitable heat stabilizers include magnesium hydroxide such as VERSAMAG technical grade, manufactured by Morton Thiokol. Other heat stabilizers are noted in the aforementioned patents, but are not as effective as those disclosed with this invention when using a combination of VERSAMAG and $TiO_2$, a minimum of 4 parts VERSAMAG to a minimum of 20 parts $TiO_2$ is preferred.

Other optional processing aids include (1) calender roll releases or lubricants (preferably 0.3 to 2.0 parts by weight) such as stearic acid, polyethylene glycol (CARBOWAX 3350 manufactured by Union Carbide), polyethylene wax (EPOLENE N34P from Eastern Chemical Products), mixtures of fatty acids and condensation products (STRUCKTOL WB 222 from Struktol Co.); (2) antioxidants for preventing polymer resin degradation; (3) flame retardants (preferably 20 to 30 parts by weight) such as alumina trihydrates (MICRAL 932SL from Solar Industries); (4) acid scavenger stabilizers for preventing liberation of HCl from the CPE (preferably 2 to 4 parts by weight) such as ERL 4221 from Union Carbide; (5) fungicides (preferably 10 to 30 parts by weight) such as barium metaborate menohydrate (BUSAN 11-MI from Buckman Laboratories); (6) cold temperature flex additives (preferably 5 to 6 parts by weight) such as ethylene-propylene-1,4 Hexadiene (EDPM) (NORDEL from DuPont), Tri(2-ethylhexyl)phosphate(TOF from C. P. Hall) or ethylene-propylene diene terpolymers (EPSYM 5508 by Copolymer Rubber). TOF is the preferred flex additive (plasticizer) since it provides highly effective mildew resistance; (7) anti-blocking agents (preferably 0.5 to 1.0 parts by weight) such as a saturated fatty acid amide-stearamide (KEMAMIDE S by Witco Chemical); or (8) CPE stabilizers such as organo barium salt (MARK 1117 from Argus Div. of Witco Chemical).

A useful combination of antioxidants has been identified to provide long term aging protection and to meet short term accelerated weathering specifications requiring high temperatures with XENON light with a controlled irradiance apparatus such as that described in ASTM G26 Standard Practice for Operting Light Exposure with and without water for exposure of nonmetallic materials. This effective antioxident package is Irganox 1010 at 1.0 PHR combined with dilauryl thiodipropionate (DLTDP) at 2.0 PHR. Irganox 1010 is the brand name for tetrakis [methylene (3,5-di-tert-butyl-4-hydroxyhydrocinnamate) ]methane with an empirical formula of $C_{73}H_{108}O_{12}$. Irganox 1010 is described in detail in U.S. Pat. Nos. 3,285,855 and 3,644,482, both of which are incorporated herein by reference. The DLTDP produces a thiosynergist effect to the Irganox 1010 that provides a marked improvement over Irganox 1010 alone. Irganox 1010 is from Ciba-Geigy. DLTDP is from Argus Division of Witco Chemical, Brooklyn, N.Y.

Testing done in a Xenon Arc artificial weathering machine at 86° C. black panel with intermittent water spray for 500 hours comparing the triblend material of this invention with and without the Irganox 1010/DLTDP antioxidant package exhibited retained elongations of 40% without the antioxidant package and 230% with the antioxidant package. This difference in elonagtion is marked and significant. It will be appreciated that higher retained elongations are important for maintaining a well functioning flexible membrane. Thus, the substantially higher elongations obtained using the Irganox 1010/DLTDP antioxidant package described above forms an important feature of this invention.

While Irganox 1010 is the preferred component of the antioxidant package, other antioxidant compounds having sterically hindered phenolic hydroxyl groups such as Bennox 1010 from Everspring Chemical, Ltd. Taichung, Taiwan may also be used.

The present invention may also include filler materials, not to exceed 82 parts by weight to 100 parts of polymer resin, such as Camel Wite, a calcium carbonate (limestone) by Genstar Stone Products, ICE CAP K, and an aluminum silicate (clay) from Burgess Pigment. Excessive filler usage over 90.0 PHR can reduce the seamability of the membrane material if the filler reduces the total polymer below 30%.

Coloring agents of Titanium Dioxide, such as Tipure R960 by DuPont may be blended at 2.0 to 30.0 PHR to obtain a white color or blended with any color pigment such as the phthalocyamine type or any other type common to the rubber trade to obtain a desired color from pastel to mass tones. Levels for a non white pigment are 0.1 to 22.0 PHR. A preferred coloring agent is a blue pigment comprised of a blend of EPDM rubber 100.0 PHR and Heliogen L6920 Blue pigment 100.0 PHR.

Referring now to the FIGURE, a membrane suitable for use on a single ply roof is shown generally at 10. Membrane 10 includes a bottom layer 12 fused (under heat and pressure) to an upper sheet 14. Upper sheet 14 is comprised of the CSPE/CPE blend of the present invention. Bottom sheet 12 may also be comprised of the CSPE/CPE blend of this invention. Alternatively, bottom sheet 12 may be comprised of any other suitable roofing membrane which is heat sealable to upper sheet 14. For example, bottom sheet may be composed of HYPALON 45.

In general, the upper layer 14 should have as good or better weatherability characteristics than the bottom sheet 12.

Preferably, each layer 12, 14 of membrane 10 includes a reinforcement fabric or scrim 16, 18, respectively. Typically, polyester 10×10, 1000 denier plain weave.

The following non-limiting example 1 discloses a preferred formulation of the present invention which was calendered into a two layer single ply roof membrane 10 of the type shown in the FIGURE from a batch composed of the amounts of ingredients listed in terms of weight (pounds).

| Ingredient | PHR[1] |
| --- | --- |
| HYPALON 45 | 51.00 |
| TYRIN 725 CPE | 49.00 |
| ATTANE 4004 | 20.00 |
| VERSAMAG TECH PDR | 5.00 |
| KEMAMIDE S | 0.50 |
| STRUCKTOL WB 222 | 2.50 |
| BUSAN 11-MI | 15.00 |
| CAMEL-WITE | 62.00 |
| ICE CAP K | 20.00 |
| TiO2 | 20.00 |
| EPDM | 6.00 |

-continued

| Ingredient | PHR[1] |
|---|---|
| ERL 4221 | 2.20 |
| MARK 1117 | 1.00 |
| MICRAL 932 SL | 20.00 |
| #2175 BLUE MB | 0.002 |
| CARBOWAX 3350 | 1.00 |
| TOF | 6.00 |
| IRGANOX 1010 | 1.0 |
| DLTDP | 2.0 |
| Total | 284.202 |

[1]Where PHR is based on the combined CSPE/CPE = 100 parts.

MUD CRACKING TEST

A test was conducted to simulate the effects of cracking caused by highly air polluted environments. A mud crack solution was made to simulate the sludge which forms on roof membranes in such polluted environments. The intent is to make a water soluble solution (no solvent) which reproduces the effect of a water soluble pollution sludge.

MUD CRACK SOLUTION AND PROCEDURE

1. Mix well until all ingredients are set forth below in solution (e.g., 1st solution).

| INGREDIENT | GRAMS |
|---|---|
| 1st Solution | |
| Flour | 80 |
| Water | 284 |
| Molasses | 20 |
| Dark Corn Syrup | 20 |
| Corn Starch | 20 |
| Soft Carbon Black | 5 |

2. Apply 25 grams of 1st solutaion on a 2½ inch surface, break surface tension by wetting out with the test person's fingers by rubbing along the water line.

3. Mix second solution as follows:

| 2nd Solution | |
|---|---|
| Corn Starch | 290 |
| Water | 25 |

4. Add 5 grams of 2nd solution with an eye dropper, placing the droplets so as to cover the baked out surface (first solution) of the first phase. Do not mix 2nd solution into 1st solution. Dry at 180° F. for 4 hours. After drying, wash off with warm water. While under flowing warm water, the baked material may be loosened by a soft brush. Examine the surface with a 10x to 15x magnification.

Blends of resin and CSPE (Hypalon) were made at 10, 20, 30, 40 and 50 parts, i.e., 80/10, 60/40, etc. Resins used were ABS, HIGH STYRENE BUTADIENE RATIOS, PVC, POLYSAR SS RESINS, ABS/PVC, PVC/ELVALOY, VESTENAMER, PLIOLITE S6B & S6F, MED & HIGH P, SILASTIC 2000 SILICONE RUBBER, and TIPAL TPE 4111.

Any materials with Hypalon in it developed cracks with the important exception of tests which were performed on the novel CSPE/CPE/ULDPE blend of the present invention. The only other exception was high levels of ABS resin 50 to 60 parts; however, they were not suitable for commercial use because of high stiffness or rigidity (e.g., lack of flexibility).

As mentioned, After subjecting the CSPE/CPE/ULDPE blend of the present invention to the above-described mud cracking test, the roof membrane of this invention did not exhibit the cracking associated with standard CSPE roof membranes as well as the other CSPE blends tested. The ability of the present invention to withstand the mud cracking test is a significant advance in the roof membrane field.

The following Table 1 compares physical parameters (per ASTM D412) between a standard prior art Hypalon roof membrane and a CSPE/CPE blend roof membrane in accordance with the present invention.

TABLE 1

| Sample | Tensile Strength (psi) |
|---|---|
| HYPALON STANDARD ROOF MEMBRANE[1] | |
| 1 | 1146 |
| 2 | 1128 |
| 3 | 1149 |
| 1–3 (avg.) | 1141 |
| PRESENT INVENTION ROOF MEMBRANE | |
| 4 | 1374 |
| 5 | 1448 |
| 6 | 1340 |
| 4–5 (avg.) | 1387 |

[1]as sold by JPS Elastomerics Corp. under the HI-TUFF trademark.

As clear from a review of Table 1, the membrane of the present invention exhibits an average tensile strength which is approximately 246 psi higher than the prior Hypalon roof membrane. This increased tensile strength facilitates the improvement of the present invention in its ability to withstand highly polluted environments.

It will be appreciated that the material of this invention is easily processed on the rolls of a rubbermill (i.e., calender) to form continuous sheets of membrane suitable for use in single ply roofing and other similar applications. In a preferred embodiment, a membrane formed from the composition of this invention is used as the upper layer of a multilayer single ply roof.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A single ply roofing membrane comprising:
   a first lower layer, and
   a second upper layer fused to said lower layer, said upper layer comprising a blend of polymeric resins, said resin blend including chlorinated polyethylene (CPE) resin, chlorosulfonated polyethylene (CSPE) resin and at least one crystalline polyolefin, said resin blend further comprising an amount of the total membrane formulation effective to_both (1) provide acceptable weldability properties to said single ply roofing membrane and (2)reduce cracking and tearing of said single ply roofing membrane caused by polluted enviornments.

2. The membrane of claim 1 wherein:
   said effective amount of said resin blend comprises about 30 to 38 weight percent of the total membrane formulation.

3. The membrane of claim 1 wherein:

said combined CPE/CSPE component comprises about 49 to 51 parts by weight CPE and about 51 to 49 parts by weight CSPE.

4. The membrane of claim 2 wherein:

said combined CPE/CSPE component comprises about 49 to 51 parts by weight CPE and about 51 to 49 parts by weight CSPE.

5. The membrane of claim 1 further including:

at least one heat stabilizer.

6. The membrane of claim 5 wherein said heat stabilizer comprises magnesium hydroxide.

7. The membrane of claim 6 including:

$TiO_2$ in an effective amount to synergistically combine with said magnesium hydroxide.

8. The membrane of claim 6 wherein:

said heat stabilizer is present in an amount of from about 4.0 to 6.0 parts by weight with respect to said CPE/CSPE component.

9. The membrane of claim 1 wherein:

said crystalline polyolefin is present in an amount of from about 20 to 30 parts by weight with respect to said CPE/CSPE component.

10. The membrane of claim 1 wherein:

said crystalline polyolefin resin comprises low density polyethylene.

11. The membrane of claim 1 further including at least one of the additives selected from the group comprising:

lubricants, antioxidants, flame retardants and acid scavenger stabilizers.

12. The membrane of claim 1 further including:

reinforcement fabric, said polymeric resin impregnating said reinforcement fabric.

13. The membrane of claim 1 wherein:

said membrane is formed from continuous calendered sheets.

14. The membrane of claim 1 including an antioxidant package comprising:

a thiosynergistic combination of dilauryl thiodipropionate and at least one antioxidant compound having sterically hindered phenolic hydroxyl groups.

15. The membrane of claim 14 wherein said antioxidant compound comprises:

tetrakis[methylene (3,5-di-tert-butyl-4-hydroxyhydrocinnamate)].

16. The membrane of claim 1 including:

at least one cold temperature flex additive.

17. The membrane of claim 16 wherein said cold temperature flex additive comprises:

Tri(2-ethylhexyl) phosphate.

* * * * *